United States Patent [19]

Onishi

[11] Patent Number: 4,770,138
[45] Date of Patent: Sep. 13, 1988

[54] FUEL INJECTION TYPE INTERNAL COMBUSTION ENGINE

[75] Inventor: Sigeru Onishi, Kanazawa, Japan

[73] Assignee: Nippon Clen Engine Research Institute Co. Ltd., Ishikawa, Japan

[21] Appl. No.: 970,414

[22] Filed: Apr. 23, 1987

[30] Foreign Application Priority Data

| Jun. 19, 1986 | [JP] | Japan | 61-144567 |
|---|---|---|---|
| Nov. 11, 1986 | [JP] | Japan | 61-266751 |
| Dec. 24, 1986 | [JP] | Japan | 61-31670 |
| Jan. 15, 1987 | [JP] | Japan | 62-7940 |

[51] Int. Cl.$^4$ .................... F02F 3/26; F02B 19/12
[52] U.S. Cl. .................... 123/276; 123/280; 123/41.82 R; 123/308; 123/430; 123/500
[58] Field of Search .......... 92/213; 123/41.82 R, 123/193 P, 276, 279, 280, 308, 430, 432, 500, 501

[56] References Cited

U.S. PATENT DOCUMENTS

| 2,431,875 | 12/1947 | MacKenzie | 123/276 X |
|---|---|---|---|
| 2,762,351 | 9/1956 | Canoose | 123/257 X |
| 2,775,493 | 12/1956 | Cheney | 92/213 |
| 2,855,906 | 10/1958 | Galli | 123/276 X |
| 3,209,735 | 10/1965 | Clarke | 123/276 |
| 3,244,159 | 4/1966 | Meurer | 123/279 X |
| 4,162,669 | 7/1979 | Igashira et al. | 123/210 |
| 4,426,982 | 1/1984 | Lehner et al. | 123/501 |
| 4,427,151 | 1/1984 | Trenne | 239/87 |
| 4,543,931 | 10/1985 | Hitomi et al. | 123/308 |
| 4,616,612 | 10/1986 | Jane | 123/276 |
| 4,625,682 | 12/1986 | Dietrich et al. | 123/41.31 |
| 4,658,772 | 4/1987 | Auth et al. | 123/145 A |
| 4,667,630 | 5/1987 | Sasaki | 123/254 |
| 4,671,233 | 6/1987 | Iwashita et al. | 123/308 |

FOREIGN PATENT DOCUMENTS

| 71279 | 4/1957 | France | 123/276 |
|---|---|---|---|
| 57-8314 | 1/1982 | Japan | 123/276 |
| 59-79031 | 5/1984 | Japan | 123/276 |
| 767145 | 1/1957 | United Kingdom | 123/276 |
| 1448797 | 9/1976 | United Kingdom | 123/276 |

OTHER PUBLICATIONS

"A New Concept of Diesel Combustion" by P. H. Schweitzer, reprinted from *Automotive Industries* 6/15/56 (4 pages).

Primary Examiner—Samuel Scott
Assistant Examiner—Allen J. Flanigan
Attorney, Agent, or Firm—Stevens, Davis, Miller & Mosher

[57] ABSTRACT

An engine comprising a piston having a cavity formed on the top face thereof. A projection having an impingement face at the top thereof is formed at the center of the cavity. Fuel is injected from a fuel injector toward the impingement face to form a richer air-fuel mixture around the projection. A spark plug or a glow plug is arranged to ignite the richer air-fuel mixture at the end of the compression stroke.

35 Claims, 25 Drawing Sheets

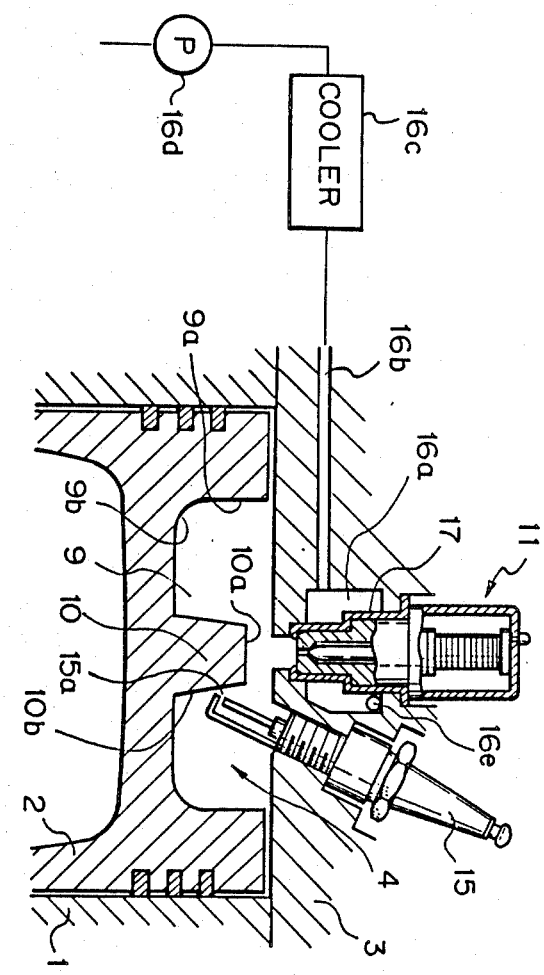

FUEL INJECTION TYPE INTERNAL COMBUSTION ENGINE

BACKGROUND OF THE INVENTION

1. Field of the Invention

The present invention relates to a fuel injection type internal combustion engine.

2. Description of the Related Art

A fuel injection type internal combustion engine is known in which the piston has a cavity formed on the top face thereof, and a fuel injector having a plurality of nozzle bores is mounted on the cylinder head. In this engine, fuel, for example, methanol, is injected in all radial directions from the nozzle bores of the fuel injector and ignited by a spark plug.

As is well known to a person skilled in the art, in order to improve the thermal efficiency of the engine, preferably the compression ratio of the engine is increased, but if the compression ratio is increased in the above-mentioned engine, knocking occurs. Consequently, since it is impossible to increase the compression ratio, it is difficult to improve the thermal efficiency.

SUMMARY OF THE INVENTION

An object of the present invention is to provide an engine in which the thermal efficiency is improved by increasing the compression ratio.

According to the present invention, there is provided an internal combustion engine comprising: an engine body having at least one cylinder bore formed therein and having an inner end wall which closes one end of said at least one cylinder bore; a piston reciprocally movable in said at least one cylinder bore and having a top face which faces said inner end wall, said top face and said inner end wall defining a combustion chamber therebetween, said top face having a cavity formed thereon and having a bottom wall; a projection formed on the bottom wall of said cavity within said cavity and having an impingement face which faces said inner end wall; a fuel injector arranged on said inner end wall and having a nozzle bore directed toward said impingement face to cause a large part of fuel injected from said nozzle bore to impinge upon said impingement face and to create a richer air-fuel mixture layer around said projection at an end of a compression stroke; and ignition means arranged on said inner end wall to ignite said richer air-fuel mixture layer at the end of the compression stroke.

The present invention may be more fully understood from the description of preferred embodiments of the invention set forth below, together with the accompanying drawings.

BRIEF DESCRIPTION OF THE DRAWINGS

In the Drawings:

FIG. 13 is a cross-sectional side view of a further embodiment of the engine according to the present invention;

DESCRIPTION OF THE PREFERRED EMBODIMENTS

Figure 1:
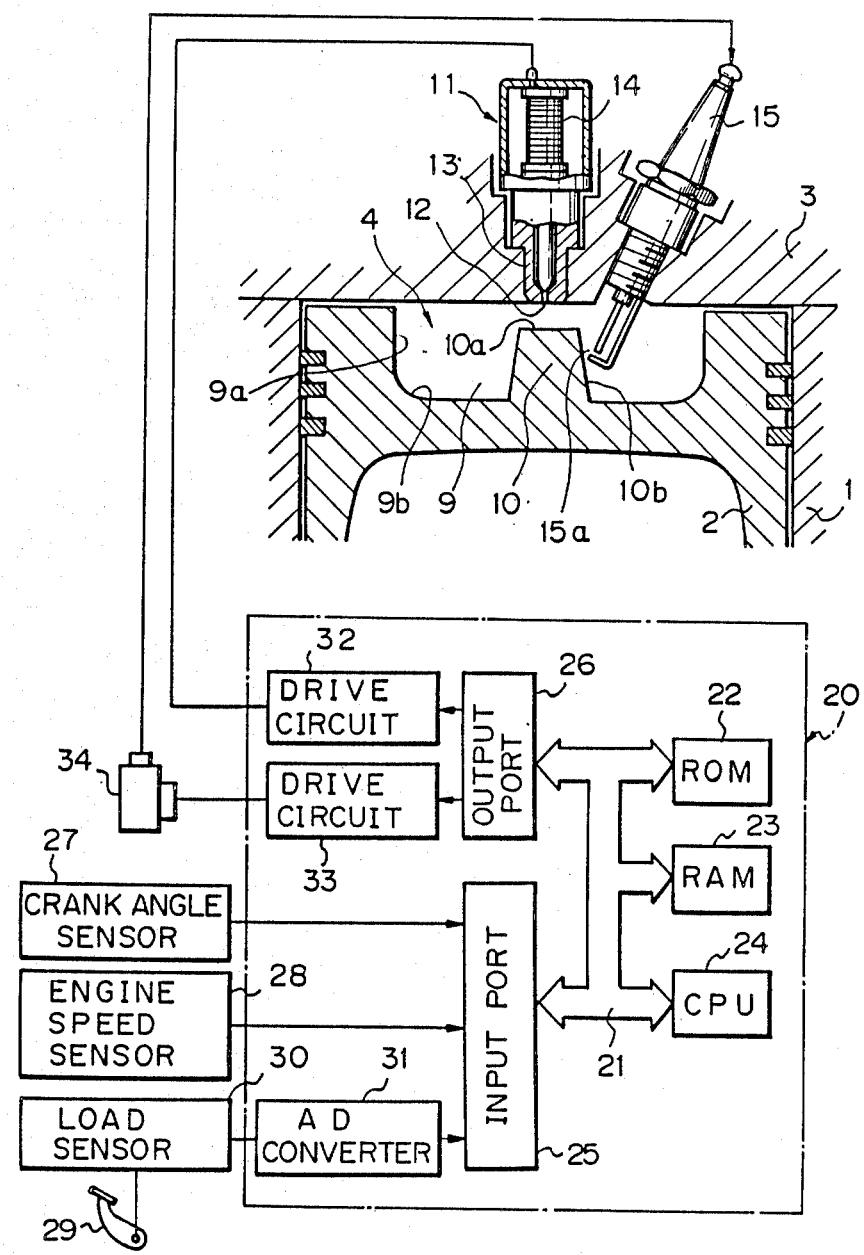
FIG. 1 is a cross-sectional side view of an embodiment of an internal combustion engine according to the present invention.
Figure 2:
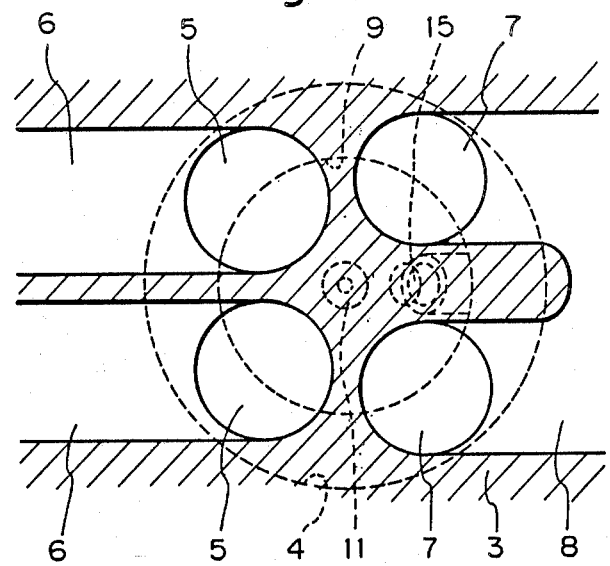
FIG. 2 is a cross-sectional plan view of the cylinder head illustrated in FIG. 1.
Figure 3:
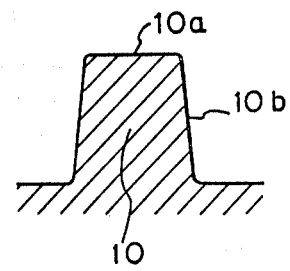
FIG. 3 is a cross-sectional view of a projection, illustrating various possible shapes of the projection.
Figure 3:
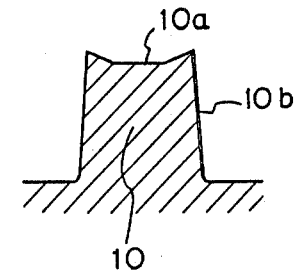
Figure 3:
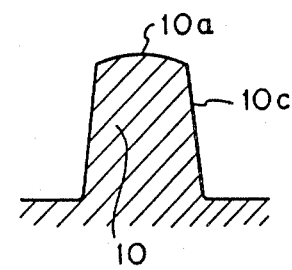

Referring to FIGS. 1 and 2, reference numeral 1 designates a cylinder block, 2 a piston reciprocally movable in the cylinder block 1, 3 a cylinder head fixed to the cylinder block 1, and 4 a combustion chamber formed between the piston 2 and the flat inner wall of the cylinder head 3; 5 designates a pair of intake valves, 6 a pair of intake passages, 7 a pair of exhaust valves, and 8 an exhaust passage. A cavity 9 having a circular cross-section is formed in the central portion of the flat top face of the piston 2. The cavity 9 has a cylindrical circumferential wall 9a and a substantially flat bottom wall 9b. A projection 10 projecting toward the cylinder head 3 is formed on the central portion of the bottom wall 9b. The projection 10 has an impingement face 10a having a circular shape and extending in parallel to the top face of the piston 2 and has a frustum-shaped circumferencial wall 10b having a cross-sectional area which increases downward. In the embodiment illustrated in FIG. 1, the impingement face 10a is located on the axis of the cylinder. The impingement face 10a may be formed so that it has a flat shape as illustrated in FIG. 3(a), a concave shape having a concaved central portion as illustrated in FIG. 3(b), or a convex shape convexing toward the cylinder head 3, as illustrated in FIG. 3(c).

A fuel injector 11 is arranged at the center of the inner wall of the cylinder head 3. This fuel injector 11 comprises a single nozzle 12, a needle 13 controlling the opening operation of the nozzle 12, and a piezoelectric element 14 for actuating the needle 13. When a voltage is applied to the piezoelectric element 14, the piezoelectric element 14 expands in the longitudinal direction thereof, and the opening operation of the nozzle bore 12 is carried out by moving the needle 13 in the longitudinal direction. Note, instead of the fuel injector 11 operated by the piezoelectric element 14, a conventional fuel injector operated by a solenoid, or a conventional fuel injector having a needle actuated by a discharge pressure of a fuel injection pump may be used. The piezoelectric element 14 of the fuel injector 11 is connected to an electronic control unit 20, and thus the fuel injecting operation from the fuel injector 11 is effected by the output signal from the electronic control unit 20. A spark plug 15 is mounted on the cylinder head 3. The spark gap 15a of the spark plug 15 is arranged to be very close to the circumferential wall 10b of the projection 10 when the piston 15 reaches top dead center (TDC) as illustrated in FIG. 1.

The electronic control unit 20 is constructed as a computer and comprises a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected by a bidirectional bus 21. A crank angle sensor 27 and an engine speed sensor 28 are connected to the input port 25. The crank angle sensor 27 produces an output signal indicating that the piston 2 in, for example, No. 1 cylinder, is at TDC, and thus the cylinder at which the injecting operation of fuel should be carried out is determined from the output signal of the crank angle sensor 28. The engine speed sensor 28 produces an output pulse at each 30 degree rotation of the crankshaft (not shown) of the engine. Therefore, it is possible to calculate the present crank angle (CA) and the engine speed from the output signal of the engine speed sensor 28. A load sensor 30 is connected to an accelerator pedal 29 and connected the input port 25 via an AD converter 31. The load sensor 30 produces an output voltage which is proportional to the depression of the accelerator pedal 29. The output port 26 is connected to the piezoelectric element 14 of the fuel injector 11 via a drive circuit 32 and connected to the spark plug 15 via a drive circuit 33 and an ignitor 34.

The fuel injection and ignition process will be hereinafter described with reference to FIG. 4.

Figure 4:
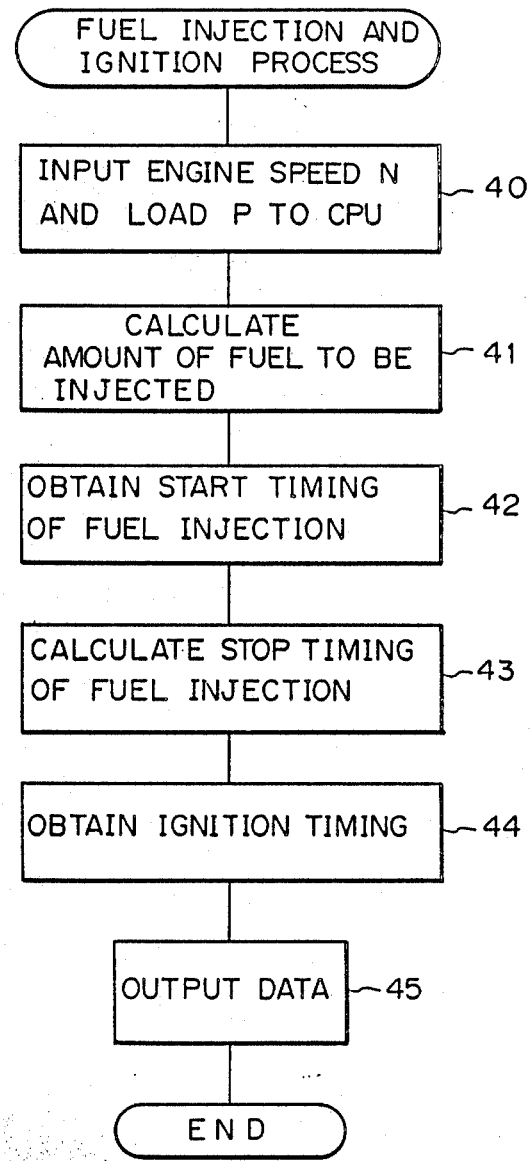
FIG. 4 is a flow chart of the process for the control of fuel injection and ignition.
Figure 5:
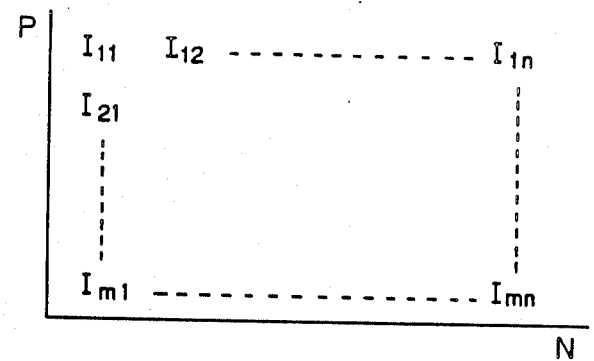
FIG. 5 is a diagram illustrating a map for the start timing of the fuel injection.
Figure 6:
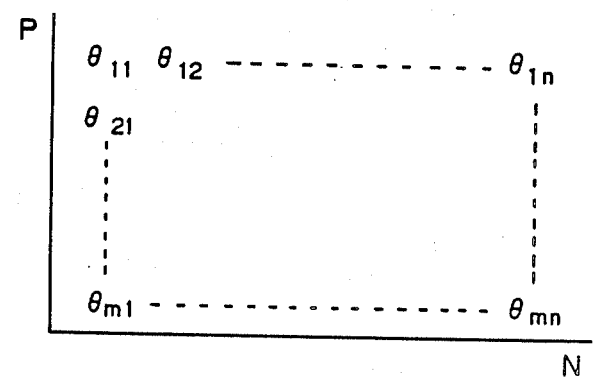
FIG. 6 is a diagram illustrating a map for the ignition timing.

Referring to FIG. 4, in step 40, the engine speed NE calculated from the output pulses of the engine speed sensor 28 is input to the CPU 24, and the output signal of the load sensor 30, which represents the load of the engine P, is also input to the CPU 24. Then, in step 41, the amount of fuel to be injected from the fuel injector 11 is calculated from, for example, the engine load P. Then, in step 42, the start timing of the fuel injection is obtained from the engine speed N and the engine load P. The relationship between the start timing of the fuel injection I and N, P is stored in the ROM 22 in the form of a map as illustrated in FIG. 5, and thus, in step 42, the start timing of the fuel injection I is obtained from the relationship stored in the ROM 22. Then, in step 43, the stop timing of the fuel injection is calculated from the start timing of the fuel injection I and the amount of fuel to be injected calculated in step 41. Then, in step 44, the ignition timing is obtained from the engine speed N and the engine load P. The relationship between the ignition timing $\theta$ and N, P is stored in the ROM 22 in the form of a map as illustrated in FIG. 6, and thus, in step 44, the ignition timing $\theta$ is obtained from the relationship stored in the ROM 22. Then, in step 45, data representing the start timing of the fuel injection I, the stop timing of the fuel injection, and the ignition timing $\theta$ is output to the output port 26, and the fuel injecting and igniting operations are carried out on the basis of this data.

Figure 7:
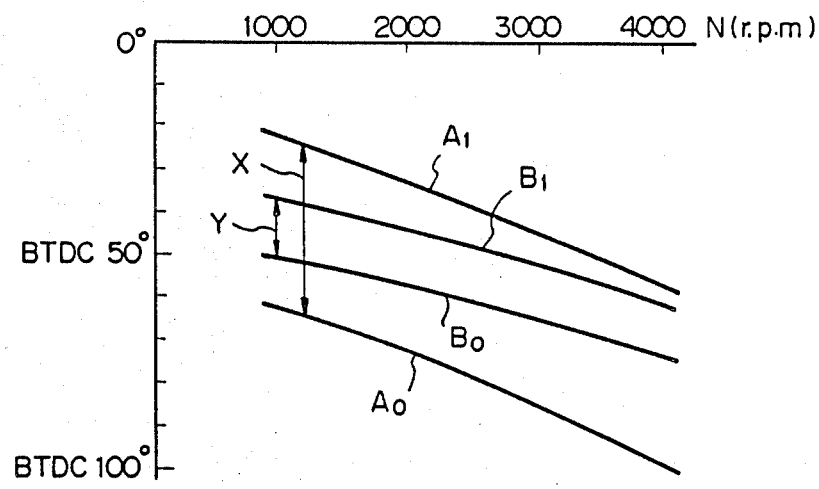
FIG. 7 is a diagram illustrating injection timing.
Figure 8:
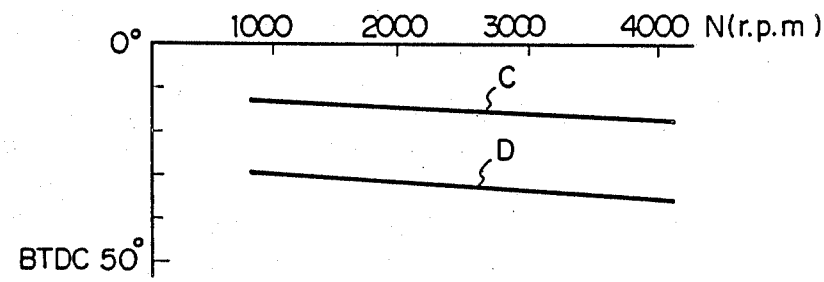
FIG. 8 is a diagram illustrating ignition timing.

FIG. 7 illustrates an example of the fuel injection timing where methanol is used as the fuel, and FIG. 8 is illustrates an example of the ignition timing where methanol is used. In FIG. 7, line $A_0$ indicates the start timing of the fuel injection when the engine is operating under a heavy load, and line $A_1$ indicates the stop timing of the fuel injection where the engine is operating under a heavy load. Consequently, the arrow X in FIG. 7 indicates the length of time during which the injecting operation is carried out when the engine is operating under a heavy load. In addition, in FIG. 7, line $B_0$ indicates the start timing of the fuel injection where the engine is operating under a light load, and line $B_1$ indicates the stop timing of the fuel injection where the engine is operating under a light load. Consequently, the arrow Y in FIG. 7 indicates the length of time during which the injecting operation is carried out when the engine is operating under a light load. In FIG. 8, line C indicates the ignition timing where the engine is operating under a heavy load, and line D indicates the ignition timing where the engine is operating under a light load.

As understood from FIG. 7, when the engine is operating under a heavy load, the start timing of the fuel injection occurs about 100 degree before TDC, that is, 100° BTDC. As mentioned above, FIG. 7 illustrates an example of the fuel injection timing. Consequently, the start timing of the fuel injection under a high load operating state may be slightly retarded relative to 100° BTDC or slightly advanced relative to 100° BTDC. In addition, where fuel other than methanol, that is, fuel such as gasoline, is used, the start timing of the fuel injection under a heavy load operating state may occur at about 180° BTDC. Accordingly, it is apparent that the start timing of the fuel injection is considerably advanced compared with the timing of the fuel injection adopted when methanol is used in a conventional engine. FIG. 8 indicates another example of the ignition timing, showing that, even when methanol is used, the ignition timing in some engines is different from that shown in FIG. 7. In addition, if fuel other than methanol is used, the ignition timing is also different from that shown in FIG. 8, and is in accordance with the kind of fuel used.

In the engine according to the present invention, the compression ratio can be made higher than 12:1, and the engine illustrated in FIG. 1 has a compression ratio of 16.2:1. According to the present invention, even if the engine has a high compression ratio, it is possible to obtain satisfactory combustion without knocking.

A method of forming and igniting an air fuel mixture will be hereinafter described with reference to FIGS. 9 and 10.

Figure 9:
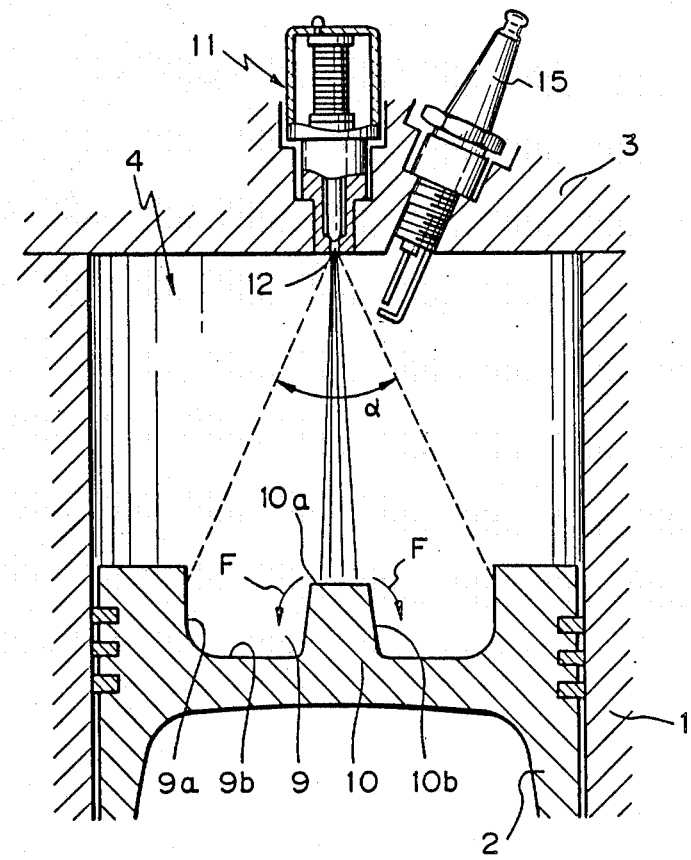
FIG. 9 is a cross-sectional side view of the engine at the time of a start of a fuel injection.

FIG. 9 illustrates the start of the injecting operation of fuel from the nozzle bore 12 of the fuel injector 11. The nozzle bore 12 is directed toward the impingement face 10a, and thus a large part of the fuel injected from the nozzle bore 12 impinges upon the impingement face 10a. That is, since the nozzle bore 12 is constructed as a single nozzle, a large part of the fuel injected from the nozzle bore 12 travels toward the impingement face 10a in the form of liquid fuel without becoming widely spread. As mentioned above, since a large part of the fuel injected from the nozzle bore 12 travels in the form of liquid fuel, the fuel thus injected has a strong penetrating force. Consequently, even if the distance between the nozzle bore 12 and the impingement face 10a is large, a large part of the fuel injected from the nozzle bore 12 reaches the impingement face 10a. The fuel impinging upon the impingement face 10a is broken up into fine particles and spread in the radial direction of the piston 2. However, since the fuel injected from the nozzle bore 12 has a downward inertia force, the fuel spreading in the radial direction travels toward the bottom wall 9b of the cavity 9 along the circumferential wall 10b of the projection 10, as illustrated by the arrow F in FIG. 9. Consequently, an area in which the density of the fuel is high is formed around the projection 10. Then, since the fuel around the projection 10 gradually spreads in the radial direction within the cavity 9, an air fuel mixture which gradually becomes lean toward the circumferential wall 9a of the cavity 9 from the circumferential wall 10a of the projection 10 is formed in the cavity 9. Since an air fuel mixture or an air in the cavity 9 is pushed downward while the piston 2 is moving upward, the air-fuel mixture and the air in the cavity 9 do not flow out upward from the cavity 9. Consequently, an air-fuel mixture layer is formed in the cavity 9, and only air exists in the combustion chamber 4 above the top face of the piston 2. Thus, the interior of the combustion chamber 4 is stratified. When the engine is operating under a heavy load, the start timing of the fuel injection is advanced, and thus the vaporizing and spreading of the fuel in the cavity 9 is sufficiently advanced when the piston 2 approaches TDC. Therefore, at this time, the interior of the cavity 9 is filled with an air-fuel mixture. Conversely, when the engine is operating under a light load, the start timing of fuel injection is retarded. Consequently, the spreading of the fuel in the cavity 9 is not sufficiently advanced when the piston 2 approaches TDC. Therefore, at this time, a rich fuel mixture layer is formed around the projection 10, and a doughnut shaped air layer is formed around the rich fuel mixture layer. Note, in either operating state of the engine (heavy load or light load), an air-fuel mixture layer which is richer than the mixture in the other area of the cavity 9 is formed in the area around the projection 10.

Figure 10:
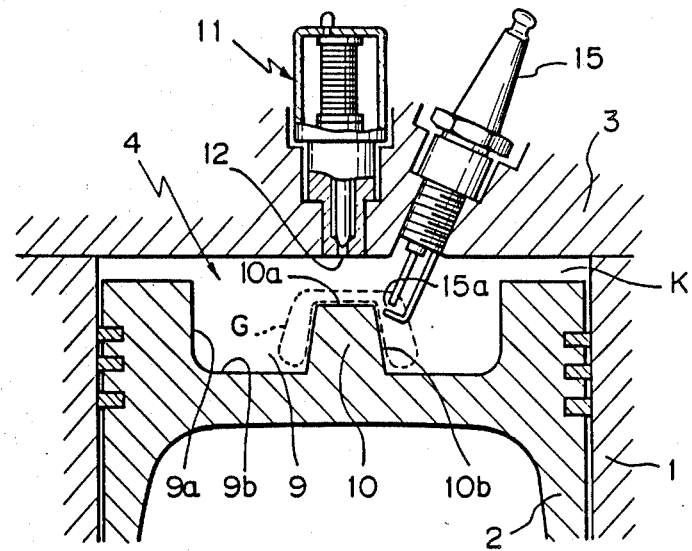
FIG. 10 is a cross-sectional side view of the engine at the time of ignition.
Figure 11:
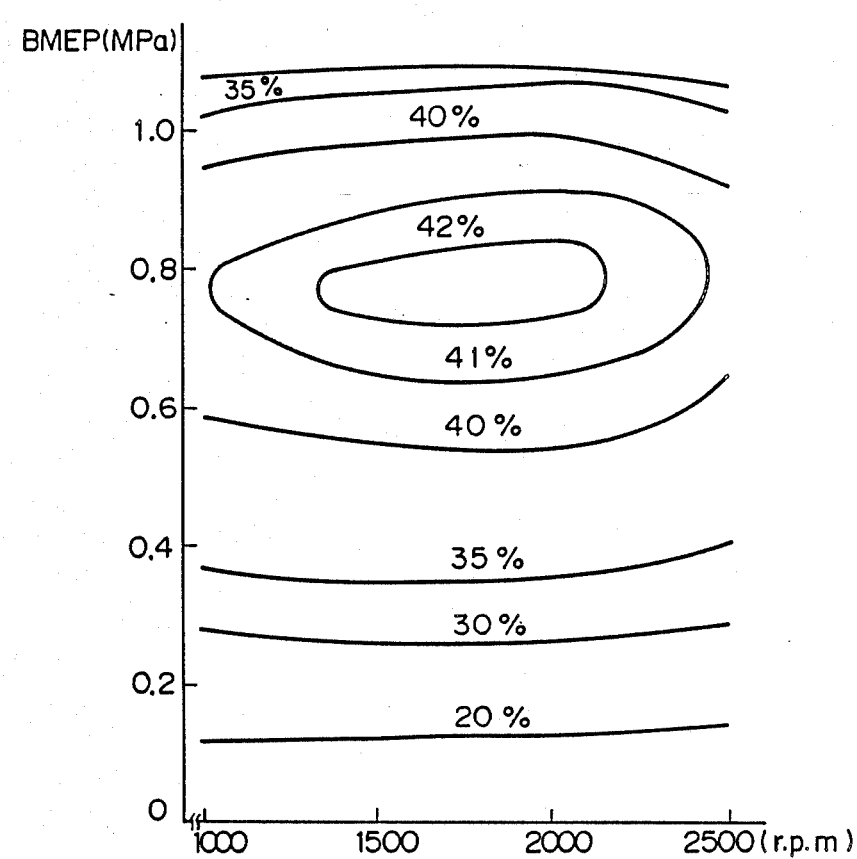
FIG. 11 is a diagram illustrating thermal efficiency.

FIG. 10 illustrates the start of the igniting operation. As mentioned above, a ring shaped rich air-fuel mixture layer is formed around the circumferential wall 10b of the projection 10 as illustrated by the broken line in FIG. 10, and the spark gap 15a of the spark plug 15 is arranged so that it is positioned within this rich air-fuel mixture layer when ignition is effected. As soon as the rich air-fuel mixture in the region G is ignited by the spark plug 15, a flame instantaneously spreads over the entire area of the rich air-fuel mixture layer. Then, the flame spreads in the cavity 9 in the radial direction and burns the air-fuel mixture in the cavity 9. Since the flame spreads from the central portion of the cavity 9 toward the peripheral portion thereof as mentioned above, the flame propagating distance becomes shorter, and the burning velocity is increased. As a result, the thermal efficiency is improved, and the amount of HC and CO produced is reduced. In addition, as mentioned above, since only air exists in the combustion chamber 4 above the top face of the piston 2, when the piston 2 approaches TDC as illustrated in FIG. 10, only air exists in the corner K of the combustion chamber 4 between the peripheral portion of the top face of the piston 2 and the flat inner wall of the cylinder head 3. Knocking occurs in such a way that, when the combustion is started and the pressure in the combustion chamber 4 increased, an air-fuel mixture existing in the corner K is compressed, causing the self-ignition of the air-fuel mixture. However, in the present invention, since only air exists in the corner K, the self-ignition can not occur in the corner K, and thus knocking does not occur. Therefore, in the present invention, it is possible to increase the compression ratio, and accordingly considerably increase the thermal efficiency. FIG. 11 illustrates the thermal efficiency where methanol is used as the fuel in the engine illustrated in FIG. 1. From FIG. 11, it will be understood that the thermal efficiency is considerably increased compared with the case where methanol is used in a conventional engine.

In the engine according to the present invention, as mentioned above, a rich air-fuel mixture layer is formed around the circumferential wall 10b of the projection 10 irrespective of the engine load, and the mixture in the rich air-fuel mixture layer is ignited by the spark plug 15. Consequently, it is possible to obtain a stable ignition of the air-fuel mixture and a successive stable combustion. Therefore, it is possible to obtain a stable idling operation of the engine without the generation of misfiring, and it is also possible to improve the thermal efficiency and reduce the amount of HC produced.

In addition, in the engine according to the present invention, a throttle valve is not arranged in the intake passages 6, and the engine load is controlled by the amount of fuel injected from the fuel injector 11. Accordingly, since a throttle valve is not arranged in the intake passages 6, it is possible to improve the thermal efficiency when the engine is operating under a partial load.

Furthermore, in the present invention, to prevent knocking, the engine is constructed so that only air exists in the combustion chamber 2 above the top face of the piston 2. To ensure than only air exists in the combustion chamber 2 above the top face of the piston 2, the entire amount of fuel injected from the fuel injector 11 is introduced into the cavity 9. Consequently, it is possible to widen the spray angle $\alpha$ (FIG. 3) of the fuel so that the entire amount of fuel injected from the fuel injector 11 travels toward the cavity 9 when the piston 2 is positioned at a crank angle (CA) corresponding to the most advanced starting time for the fuel injection. However, even if the spray angle $\alpha$ is widened as mentioned above, preferably a large part of fuel injected from the fuel injected from the fuel injector 11 is impinged on the impingement face 10a. Although it is sufficient to ensure that the entire amount of fuel injected from the fuel injector 11 is introduced into the cavity 9, if a large amount of fuel is injected from the fuel injector 11, the injected fuel must be fed into the cavity 9 at an early stage of the compression stroke. By starting the feed of the injected fuel into the cavity 9 at an early stage of the compression stroke, enough time is left before the ignition of the fuel by the spark plug 15. During this time, the spreading of the injected fuel is sufficient, and at the same time, the vaporization of the injected fuel is satisfactory promoted.

FIG. 12 through 34 illustrate various further embodiments of the present invention, as successively described hereinafter.

Figure 12:
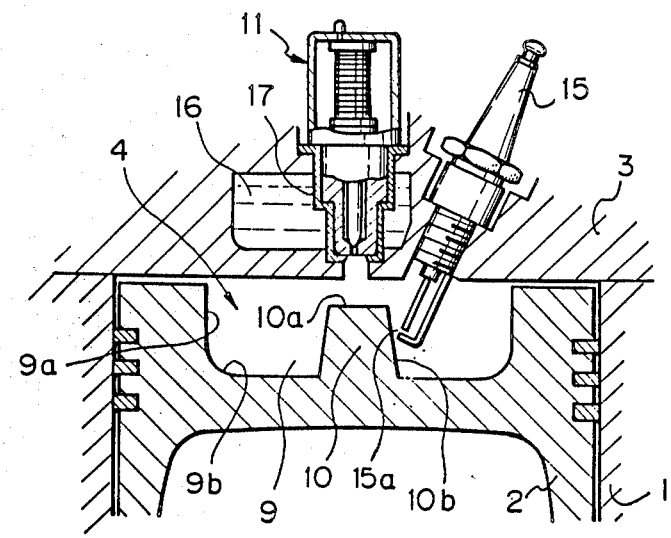
FIG. 12 is a cross-sectional side view of another embodiment of the engine according to the present invention.

Referring to FIG. 12, a cooling water passage 16 is formed in the cylinder head 3, and a hollow tube 17 made of copper and extending through the cooling water passage 16 is fitted into the cylinder head 3. The fuel injector 11 is fitted into the hollow tube 17 so that the fuel injector 11 is cooled by the cooling water flowing within the cooling water passage 16.

In the present invention, it is important that a large part of the fuel injected from the fuel injector 11 impinges on the impingement face 10a. To this end, the fuel injected from the fuel injector 11 must have a strong penetrating force and thus will not be widely spread. However, if the temperature of the fuel injector 11 is increased, fuel is atomized when flowing out from the nozzle bore 12. As a result, the fuel injected from the nozzle bore 12 is widely spread, and thus the penetrating force of the fuel is lessened. However, this results in a problem whereby it is impossible to cause a large apart of the injected fuel to impinge on the impingement face 10a. To eliminate the problem, in the embodiment illustrated in FIG. 12, the fuel injector 11 is cooled by the cooling water.

Referring to FIG. 13, a coolant chamber 16a is formed around the hollow tube 17 in the cylinder head 3 and connected to a coolant supply pump 16d via a coolant passage 16b and a cooler 16c. In this embodiment, a coolant such as cooling water, lubricating oil or air is fed into the cooler 16c by a coolant supply pump 16d and cooled in the cooler 16c. The coolant is compulsorily fed into the coolant chamber 16a, and thus the fuel injector 11 is compulsorily cooled by this coolant. The coolant then flows out from an outlet 16e. In this embodiment, since the fuel injector 11 is compulsorily cooled by the coolant, it is possible to further prevent a high temperature at the fuel injector 11.

Figure 14:
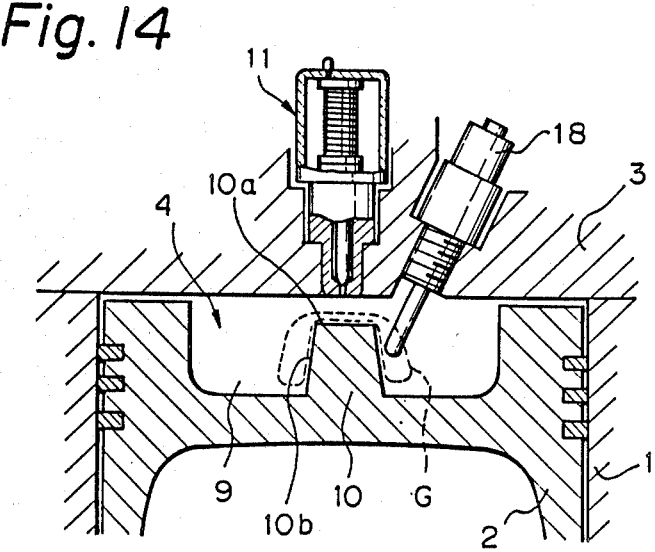
FIG. 14 is a cross-sectional side view of a still further embodiment of the engine according to the present invention.

In the embodiment illustrated in FIG. 14, instead of a spark plug, a glow plug 18 is used. This glow plug 18 is positioned within the rich air-fuel mixture layer G when ignition is carried out. That is, the glow plug 17 is arranged to be close to the circumferential wall 10b of the projection 10 when the piston 2 approaches TDC. In this embodiment, the ignition of the rich mixture in the rich air-fuel mixture layer G is carried out, when this piston 2 moves upward and the rich air-fuel mixture layer G comes into contact with the tip of the glow plug 17.

As mentioned above, in the present invention, it is possible to ignite the rich mixture in the rich air-fuel mixture layer G by using the glow plug 18. However, the temperature of the glow plug 18 is changed in accordance with a change in the engine load. That is, when the engine is operating under a heavy load, since the temperature of burnt gas around the glow plug 18 becomes high, the temperature of the glow plug 18 also becomes high, and when the engine is operating under a light load, since the glow plug 18 is cooled by excess air in the combustion chamber 4, the temperature of the glow plug 18 also becomes low. Also, an air-fuel mixture in the rich air-fuel mixture layer G becomes slightly lean as the engine load becomes low, and therefore, the rich air-fuel mixture is less easily ignited as the engine load becomes low. Consequently, in order to easily ignite the rich air-fuel mixture, the temperature of the glow plug 15 must be increased as the engine load becomes low. Note, as mentioned above, when the engine is operating under a light load, the temperature of the glow plug 15 itself becomes low, but a high temperature is required for the glow plug 15 to easily ignite the rich air-fuel mixture. Therefore, where the temperature of the glow plug 15 is not controlled as in the embodiment illustrated in FIG. 14, it is necessary to continuously feed a large electrical power to the glow plug 15 so that the temperature of the glow plug 15 is sufficiently high when the engine is operating under a light load. However, if a large electrical power is continuously fed into the glow plug 15, when the engine is operating under a heavy load, the temperature of the glow plug 15 becomes extremely high, beyond a necessary temperature. Consequently, a problem occurs in that the consumption of electrical power is increased.

Figure 15:
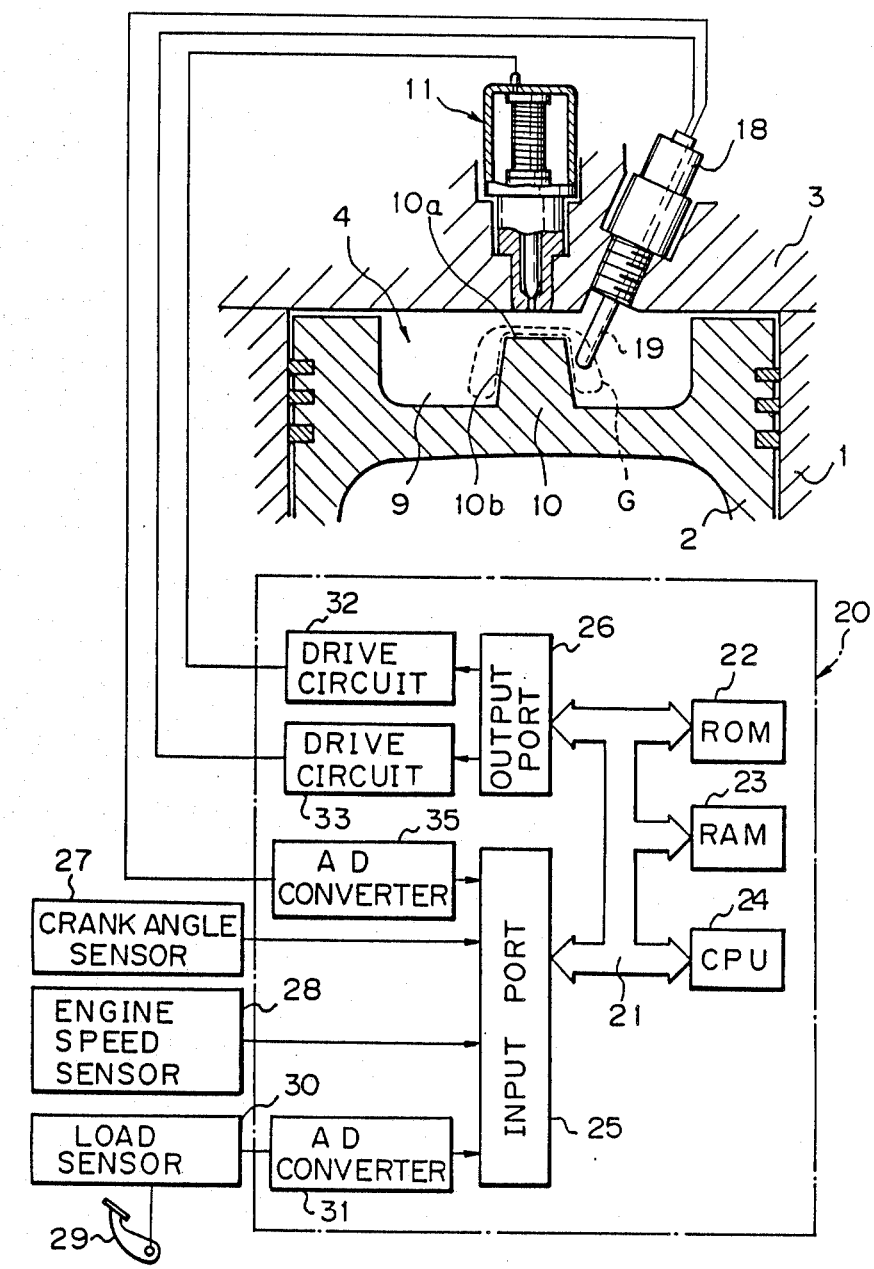
FIG. 15 is a cross-sectional side view of yet another further embodiment of the engine according to the present invention.

FIG. 15 illustrates an embodiment in which the temperature of the glow plug 18 is controlled and maintained at an optimum temperature which is changed in accordance with a change in the engine load.

Referring to FIG. 15, a temperature detector 19 illustrated by a broken line is arranged in the glow plug 18 to detect the temperature of the glow plug 18. In the embodiment illustrated in FIG. 15, the temperature detector 19 is constructed by a thermocouple. However, any other temperature detector may be adopted. The temperature detector 19, i.e., the thermocouple, is connected to the input port 25 via an AD converter 35.

Figure 16:
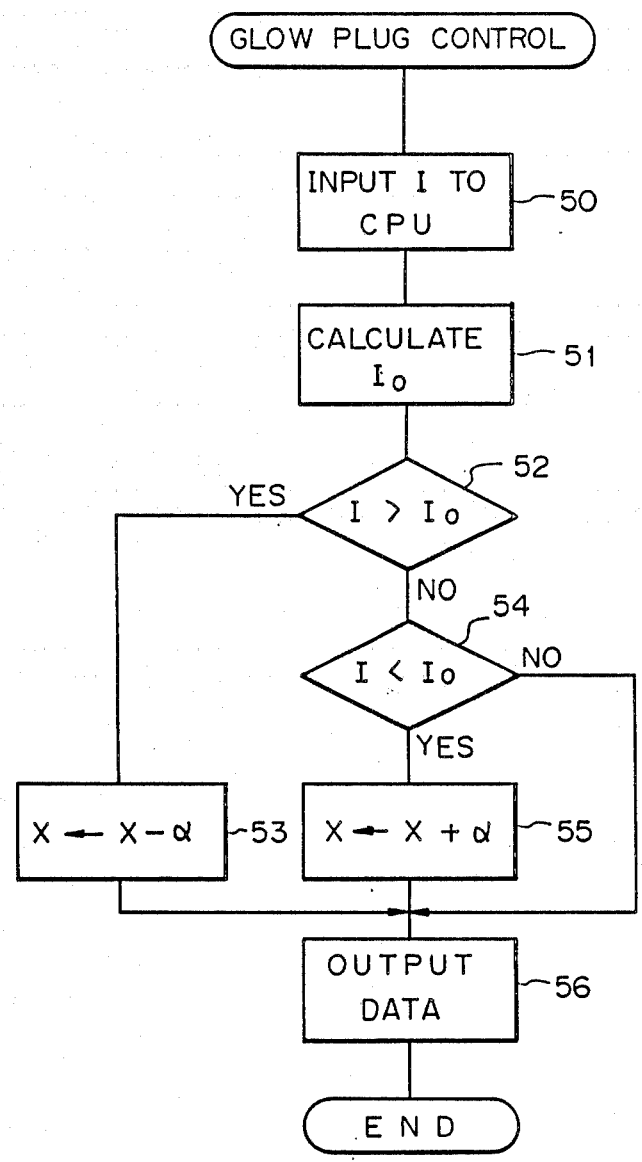
FIG. 16 is a flow chart of the process for the control of a glow plug.

FIG. 16 illustrates a flow chart of the process for controlling the glow plug 18.

Figure 17:
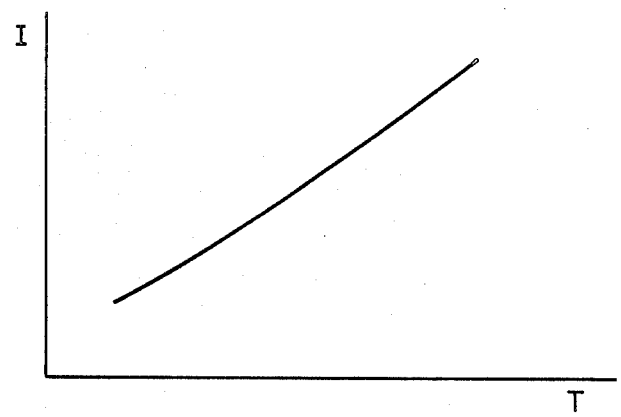
FIG. 17 is a diagram illustrating the relationship between the output current of the glow plug and the engine load.
Figure 18:
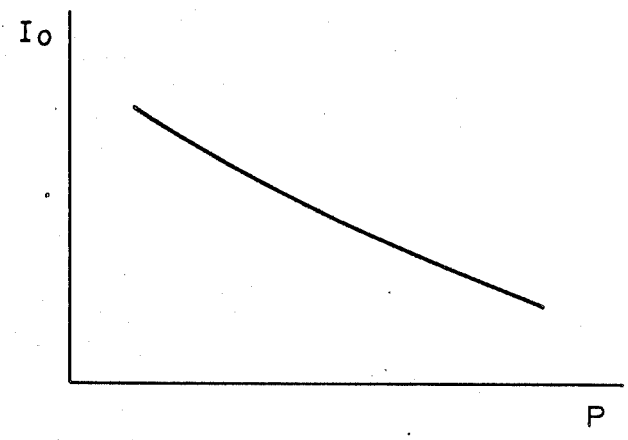
FIG. 18 is a diagram illustrating the relationship between a desired current and the engine load.

Referring to FIG. 16, in step 50, the value of the output current of the temperature detector 19 is input to the CPU 24. As illustrated in FIG. 17, the output current I of the temperature detector 19 is increased as the temperature T of the glow plug 18 is increased. Then, in step 51, a desired current $I_0$ is calculated on the basis of the output signal of the load sensor 30. FIG. 18 illustrates the relationship between the desired current $I_0$ and the engine load P. As illustrated in FIG. 18, the desired current $I_0$ becomes low as the engine load P becomes high. The relationship illustrated in FIG. 18 is stored in the ROM 22.

Then, at step 52, it is determined whether the output current I is larger than the desired current $I_0$. If $I > I_0$, the routine goes to step 53, and the current X fed to the glow plug 18 is decreased by a fixed value $a$. Conversely, if $I \leq I_0$, the routine goes to step 54, and it is determined whether the output current I of the temperature detector 19 is smaller than the desired current $I_0$. If $I < I_0$, the routine goes to step 55, and the current X fed to the glow plug 19 is increased by a fixed value $a$. Consequently, the current X fed into the glow plug 19 is controlled so that the output current I of the temperature detector 19 becomes equal to the desired current $I_0$, that is, the temperature T of the glow plug 18 becomes high as the engine load L becomes low. Then, in step 56, data representing the current X fed to the glow plug 18 is output to the output port 26, and the current X fed to the glow plug 18 is controlled by this data.

In the embodiment illustrated in FIG. 15, the temperature of the glow plug 18 is controlled in response to a change in the engine load L. However, the temperature of the glow plug 18 also may be controlled in response to changes in other parameters such as the atmospheric pressure, the temperature of the outside air, the temperature of the cooling water of the engine, and the like.

Figure 19:
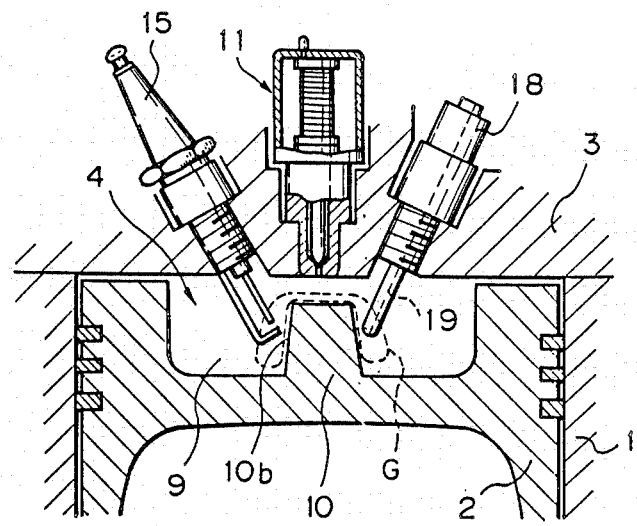
FIG. 19 is a cross-sectional side view of a further embodiment of the engine according to the present invention.

In the embodiment illustrated in FIG. 19, the spark plug 15 is provided in addition to the glow plug 18 equipped with the temperature detector 19. In this embodiment, the rich air-fuel mixture is ignited by both the spark plug 15 and the glow plug 18. However, the igniting operation by the spark plug 15 and the glow plug 18 may be controlled so that the ignition is carried out by only the glow plug 18 when the engine is operating under a light load, and that the ignition is carried out by only the spark plug 15 when the engine is operating under a heavy load.

Figure 20:
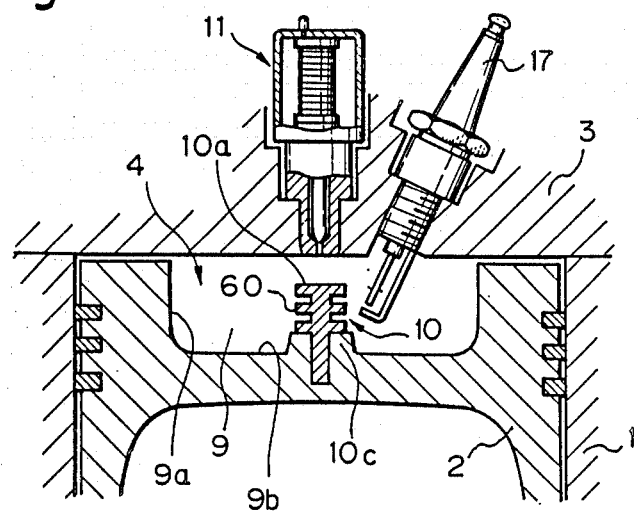
FIG. 20 is a cross-sectional side view of a still further embodiment of the engine according to the present invention.
Figure 21:
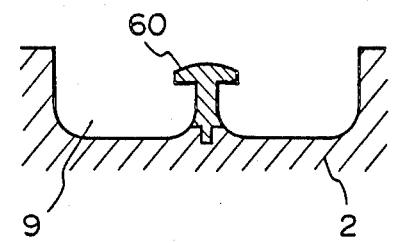
FIG. 21 is a cross-sectional side view of the piston, illustrating various possible modifications of the impingement member.
Figure 21:
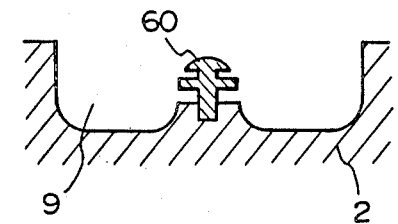
Figure 21:
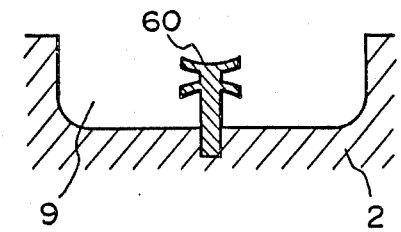
Figure 21:
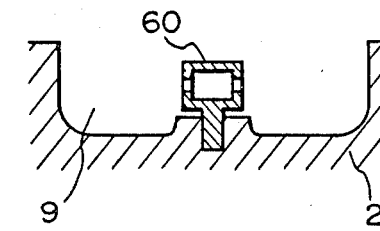

In an embodiment illustrated in FIG. 20, the projection 10 comprises a small projection 10c projecting slightly upward from the bottom wall 9b of the cavity 9, and an impingement member 60 fixed to the small projection 10c. The impingement member 60 is made of a wear-proof material which is different from the material of the piston 2, and in addition, the impingement member 60 has a heat insulating construction so that the temperature of the impingement face 10a becomes high. That is, methanol has a large latent heat, and thus the impingement element 18 has a heat insulating construction so that the temperature of the impingement face 10d is not decreased too much due to the latent heat of methanol when methanol is used as the fuel. By maintaining a high temperature of the impingement face 10a, it is possible to promote the vaporization of the fuel which impinges upon the impingement face 10a. FIG. 21 illustrated various modifications of the impingement members 60.

Figure 22A:
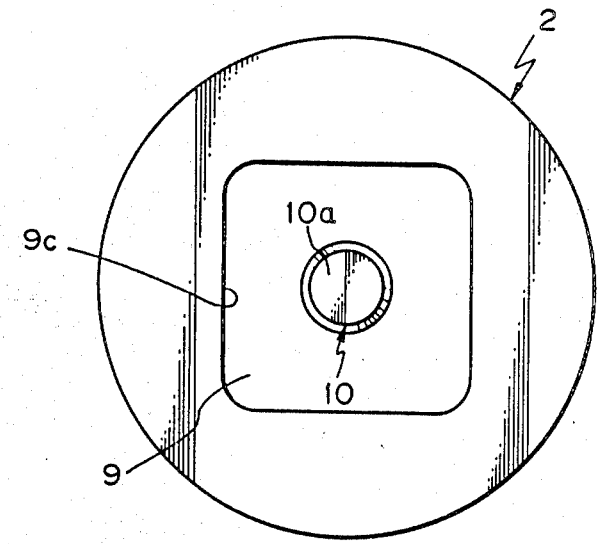
FIG. 22 is a plan view of the piston, illustrating various possible shapes of the cavity.
Figure 22B:
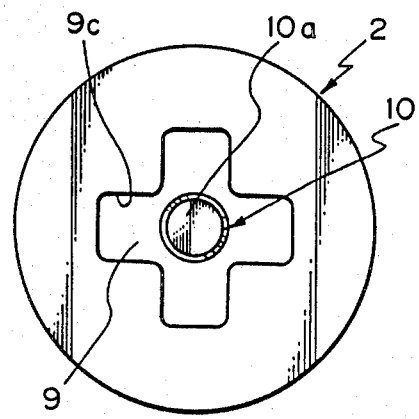
Figure 22C:
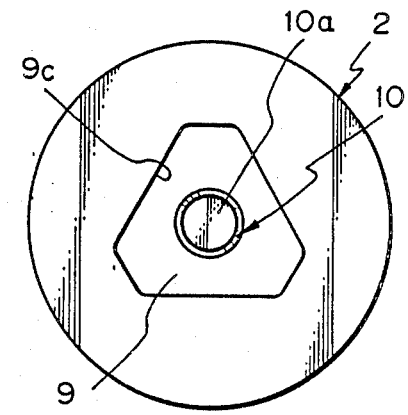
Figure 23:
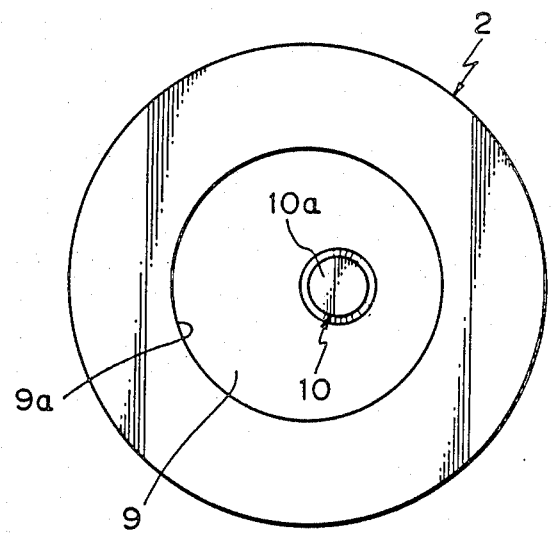
FIG. 23 is a plan view of the piston, illustrating a possible arrangement of the cavity.

FIG. 22 illustrates various modifications of the contour shape of the cavity 9. In the embodiment illustrated in FIG. 22(A), the contour of the cavity 9 has an approximately square shape, and in the embodiment illustrated in FIG. 22(C), the contour of the cavity 9 has an approximately triangular shape. In addition, in the embodiment illustrated in FIG. 22(b), the cavity 9 has a cross shape. In an embodiment illustrated in FIG. 23, the impingement face 10a is eccentrically arranged relative to the axis of the cylinder, and fuel is injected toward the impingement face 10a. In the embodiments illustrated in FIGS. 22 and 23, the distance between the impingement face 10a and the circumferential wall 9a, 9c of the cavity 9 is changed in accordance with the flame propagating direction, so that the combustion time can be controlled.

Figure 24:
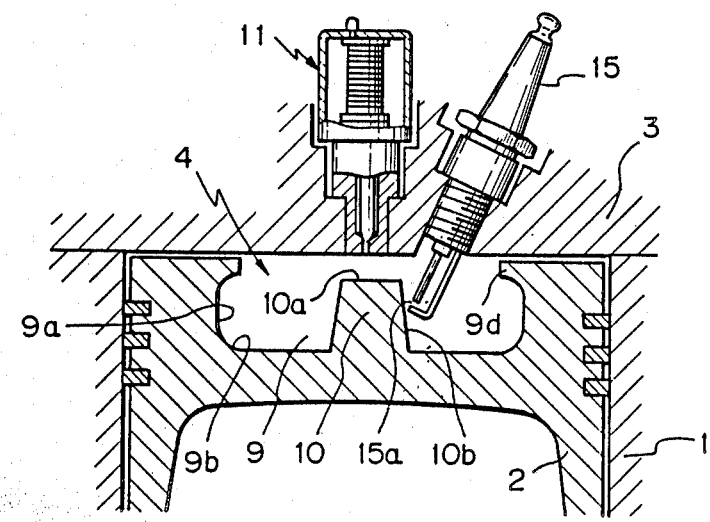
FIG. 24 is a cross-sectional side view of a still further embodiment of the engine according to the present invention.
Figure 25:
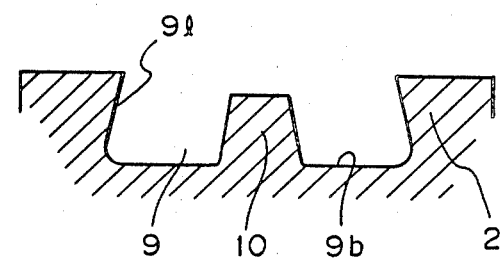
FIG. 25 is a cross-sectional side view of the piston, illustrating various possible cross-sectional shapes of the cavity.
Figure 25:
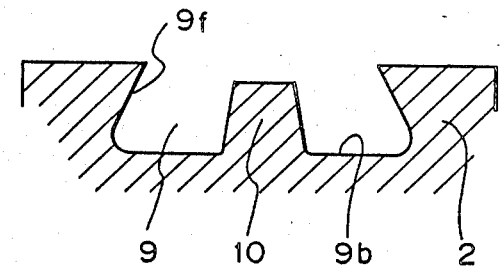
Figure 25:
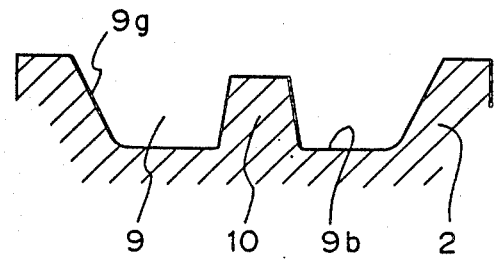

In an embodiment illustrated in FIG. 24, the circumferential wall 9a of the cavity 9 has an annular rib 9d formed thereon and radially inwardly projecting from the upper end portion of the circumferential wall 9a. FIG. 25 illustrates other various modifications of the cross-sectional shape of the cavity 9. In the embodiments illustrated in FIG. 25(A) and (B), the circumferential wall 9e, 9f of the cavity 9 has a conical shape having a cross-section which diverges towards the bottom wall 9b of the cavity 9 and, in the embodiment illustrated in FIG. 25(C), the circumferential wall 9g of the cavity 9 has a conical shape having a cross-section which converges toward the bottom wall 9b of the cavity 9.

Figure 26:
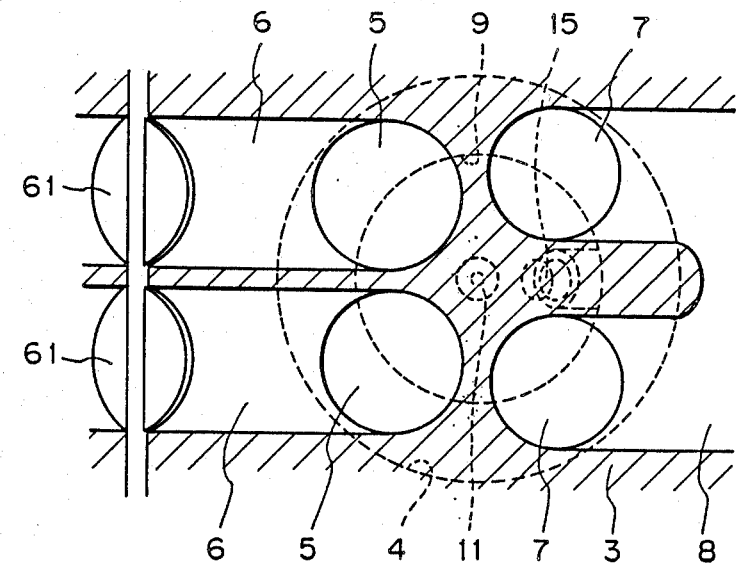
FIG. 26 is a cross-sectional plan view of yet another embodiment of the engine according to the present invention.
Figure 27:
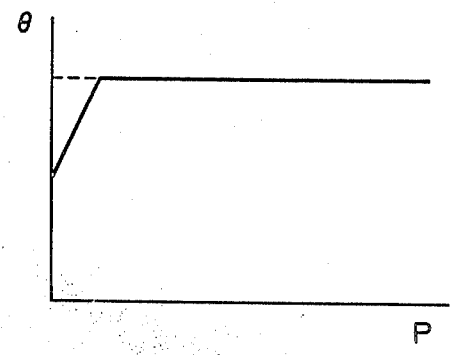
FIG. 27 is a diagram illustrating the opening degree of the air control valves.

In an embodiment illustrated in FIG. 26, air control valves 61 are arranged in the intake passages 6. FIG. 27 illustrates the relationship between the engine load P and the opening degree $\theta$ of the air control valves 41. As illustrated in FIG. 27, the air control valves 61 are half open when the engine load P is low or zero, and the air control valves 61 are abruptly fully open when the engine load P is increased. As mentioned previously, in the present invention, it is necessary to form the rich air-fuel mixture layer G around the projection 10 (FIG. 10). However, if an extremely strong swirl motion or turbulence is created in the combustion chamber 4, it is difficult to form the rich air-fuel mixture layer G around the projection 10 in some engines, particularly when the amount of fuel injected from the fuel injector 11 is small, that is, when the engine is operating under a light load. In such engines, preferably the air control valves 61 are closed to a half open position and the amount of air fed into the combustion chamber 4 reduced, so that an extremely strong swirl motion or turbulence is not created when the engine is operating under a light load.

Figure 28:
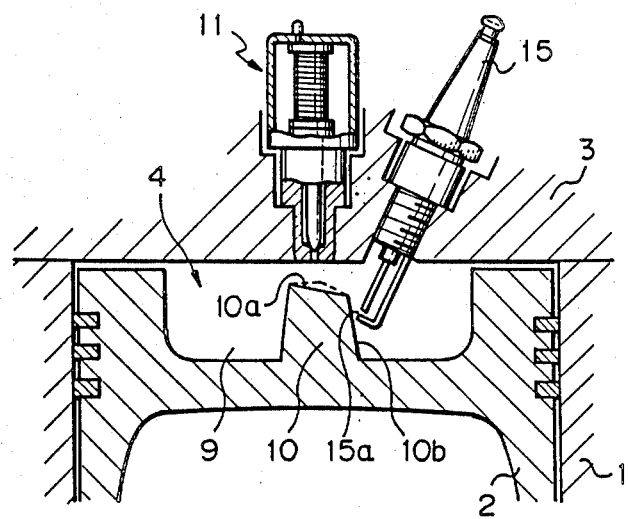
FIG. 28 is a cross-sectional side view of a further embodiment of the engine according to the present invention.
Figure 29:
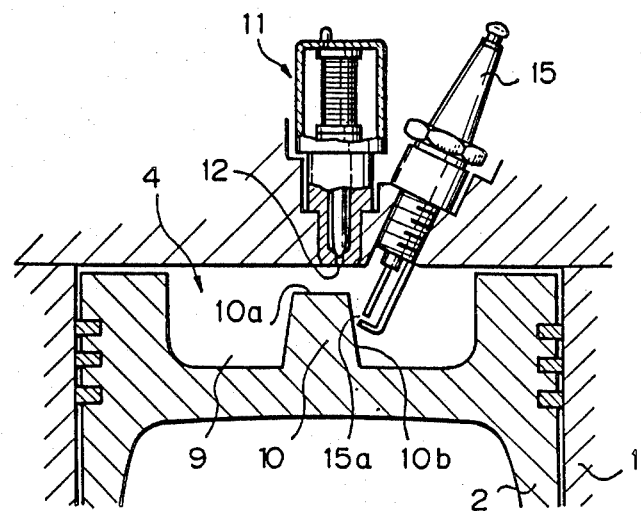
FIG. 29 is a cross-sectional side view of a still further embodiment of the engine according to the present invention.
Figure 30:
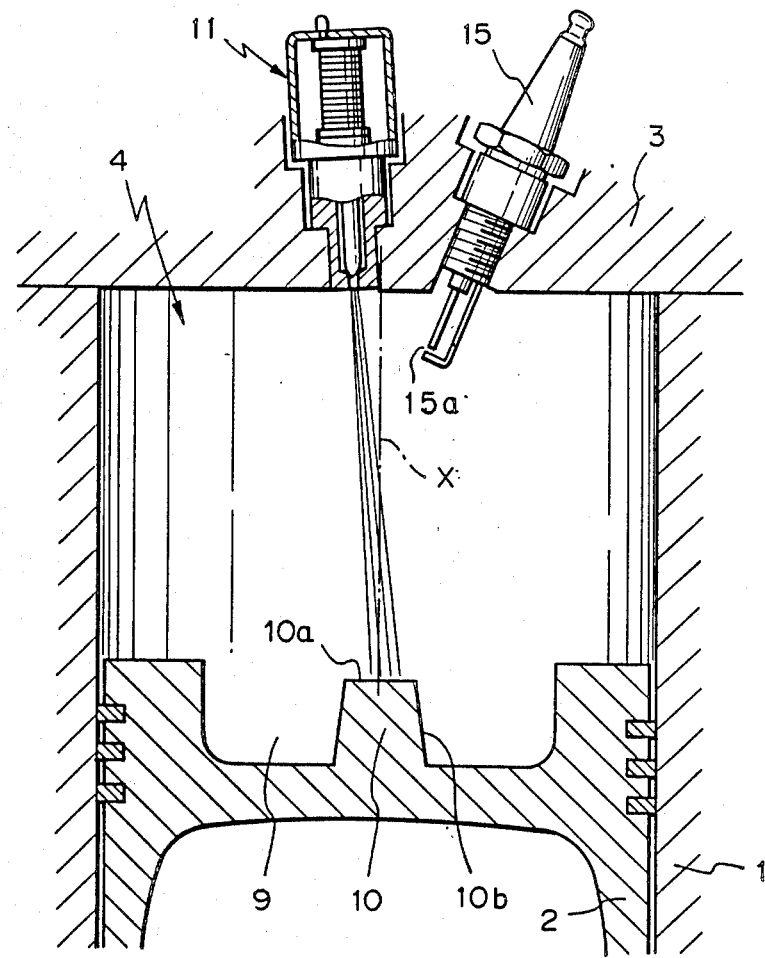
FIG. 30 is a cross-sectional side view of yet another embodiment of the engine according to the present invention.

FIGS. 28 through 30 illustrate various modifications capable of creating a further rich air-fuel mixture around the spark gap 15a of the spark plug 15.

That is, referring to FIG. 28, the impingement face 10a of the projection 10 is formed by an inclined face which is inclined downward toward the spark gap 15a of the spark plug 15. By inclining the impingement face 10a of the projection 10 toward the spark gap 15a of the spark plug 15, more fuel injected from the fuel injection 11 can be introduced around the spark gap 15a of the spark plug 15, and thus it is possible to create a further rich air-fuel mixture around the spark gap 15a of the spark plug 15. In addition, as illustrated by the broken line in FIG. 28, only one half of the impingement face 10a which is positioned near the spark gap 15a of the spark plug 15, may be formed by an inclined face.

In the embodiment illustrated in FIG. 29, the nozzle bore 12 of the fuel injector 11 is directed to the peripheral portion of the impingement face 10a, which is positioned near the spark gap 15a of the spark plug 15. In this embodiment, since more fuel injected from the fuel injector 11 is introduced around the spark gap 15a of the spark plug 15, it is possible to create a further rich air-fuel mixture around the spark gap 15a of the spark plug 15.

In the embodiment illustrated in FIG. 30, the fuel injector 11 is arranged at an opposite angle to the spark plug 15 with respect to the axis of the cylinder X, and fuel injected from the fuel injector 11 is caused to obliquely impinge upon the impingement face 10a. In this embodiment, since more fuel injected from the fuel injector 11 is introduced into a space around the circumferential wall 10a of the projection 10, which space is located on a spark gap side, it is possible to create a further rich air-fuel mixture around the spark gap 15a of the spark plug 15.

As mentioned above, in the embodiments illustrated in FIGS. 28 through 30, since a further rich air-fuel mixture can be formed around the spark gap 15a of the spark plug 15, it is possible to further improve the ignitability.

Figure 31:
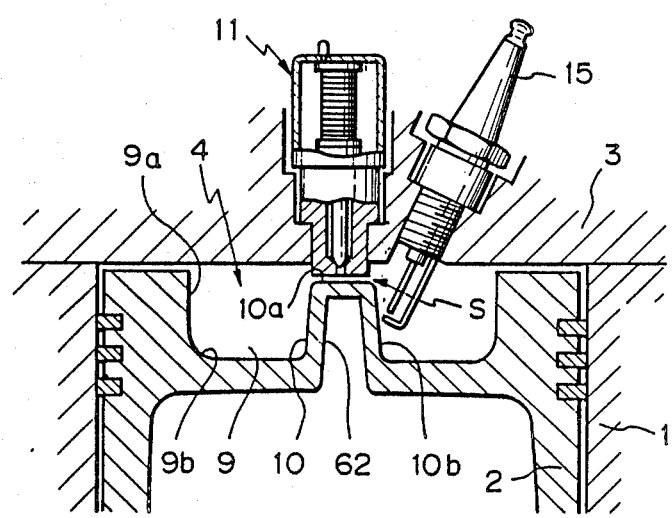
FIG. 31 is a cross-sectional side view of a further embodiment of the engine according to the present invention.

FIG. 31 illustrates an embodiment which can prevent carbon from adhering to the impingement face 10a. Where fuel having a large latent heat such as methanol is used, since the impingement face 10a is cooled due to the latent heat of the fuel, carbon is less easily adhered to the impingement face 10a. Conversely, where fuel having a small latent heat such as gasoline is used, since the impingement face 10a is not sufficiently cooled, carbon has a tendency to easily adhere to the impingement face 10a. If carbon adheres to the impingement face 10a, when fuel impinges upon the impingement face 10a, the fuel is less easily spread in the radial direction, and thus only the air-fuel mixture formed around the impingement face 10a becomes excessively rich. Consequently, it is necessary to prevent carbon from adhering to the impingement face 10a as much as possible. In the embodiment illustrated in FIG. 31, the fuel injector 11 is arranged so that the clearance S between the impingement face 10a and the top face of the fuel injector 11 becomes extremely small, for example, less than 2 mm, when the piston 2 reaches TDC. If the clearance S becomes less than about 2 mm when the piston 2 reaches TDC, the clearance S becomes smaller than the quench distance. As a result, since flame can not propagate into the clearance S, it is possible to prevent carbon from adhering to the impingement face 10a. In addition, in the embodiment illustrated in FIG. 31, a space 62 is formed in the projection 10. By spraying a lubricating oil into the space 62 and cooling the impingement face 10a, it is possible to further prevent carbon from adhering to the impingement face 10a.

Figure 32:
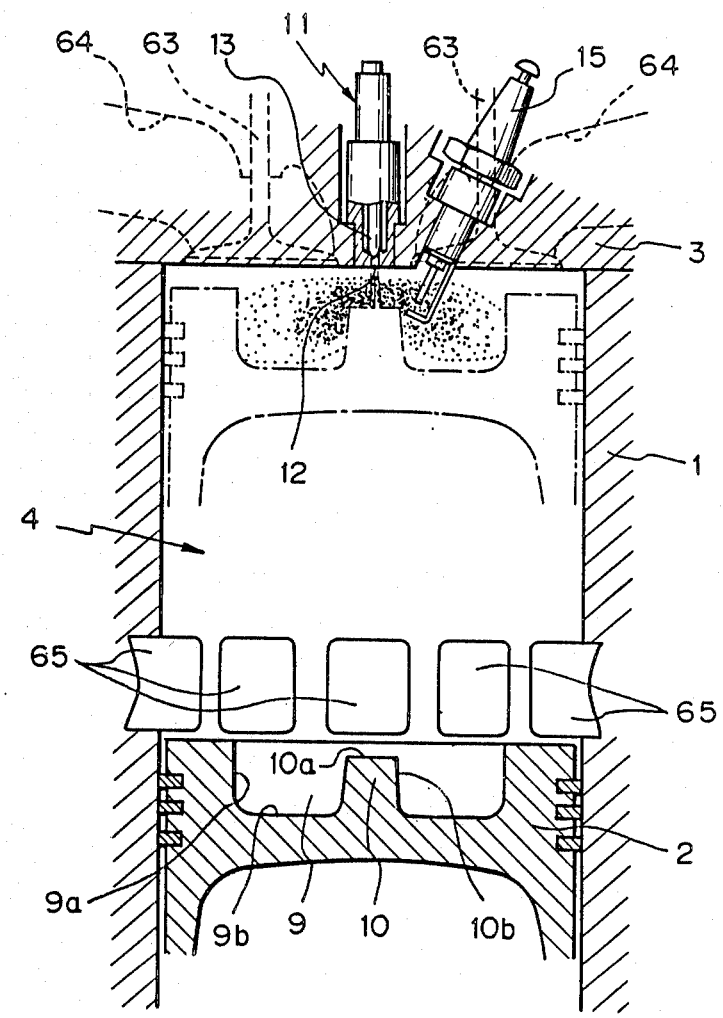
FIG. 32 is a cross-sectional side view of a still further embodiment of the engine according to the present invention.

FIG. 32 illustrates the case where the present invention is applied to a 2 stroke engine. In FIG. 32, similar components are indicated by the same reference numerals used in FIG. 1. Referring to FIG. 32, reference numeral 63 designates a pair of exhaust valves, 64 a pair of exhaust ports, and 65 a plurality of scavenge ports formed on the wall of the cylinder bore of the cylinder block 1. When the scavenge ports 65 are uncovered by the piston 2, fresh air is fed into the combustion chamber 4 from the scavenge ports 65. At this time, burnt gas in the combustion chamber 4 is pushed out into the exhaust ports 64 via the exhaust valves 63, which are open. Subsequently, when the scavenge ports 65 are covered by the piston 2, and the exhaust valves 63 are closed, the compression stroke is started. When the piston 2 approaches TDC, as illustrated by the dashed-dotted line in FIG. 32, a rich air-fuel mixture formed around the projection 10 is ignited by the spark plug 15.

Figure 33:
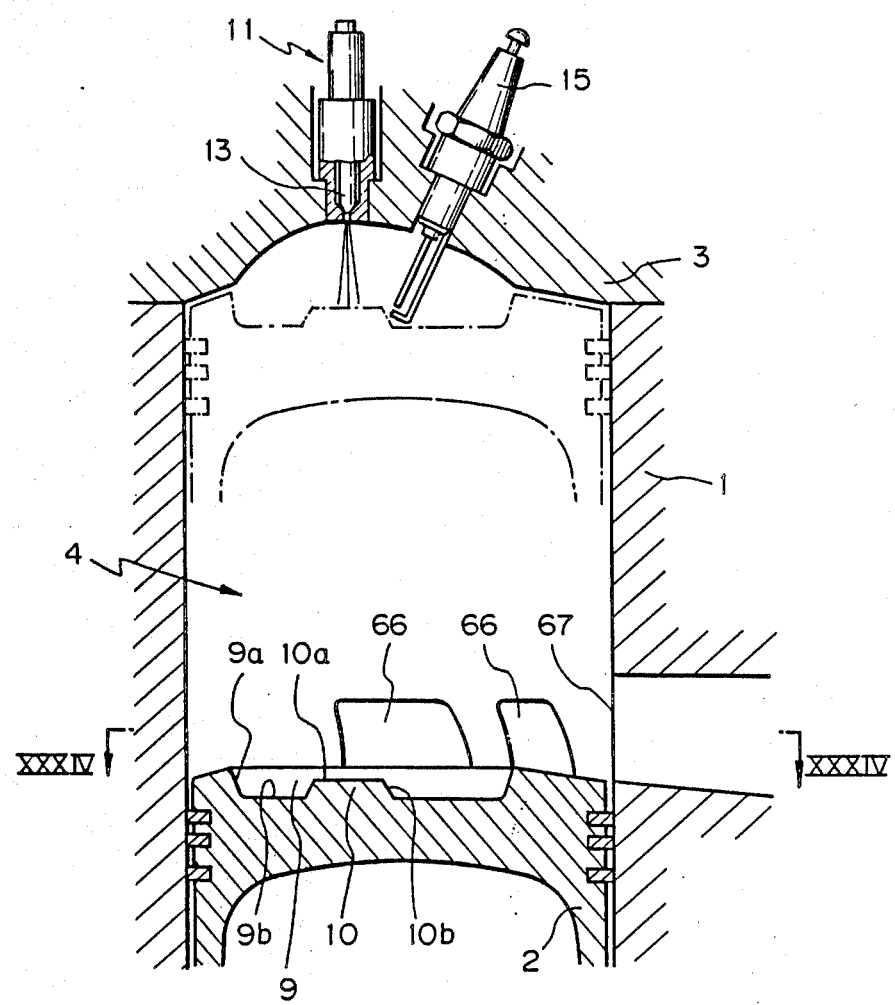
FIG. 33 is a cross-sectional side view of a still further embodiment of the engine according to the present invention.
Figure 34:
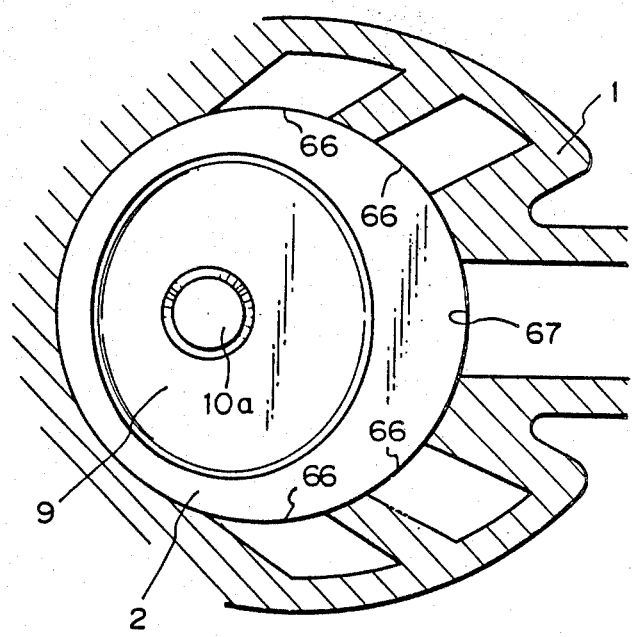
FIG. 34 is a cross-sectional plan view of the engine, taken along the line XXXIV—XXXIV in FIG. 33.

FIGS. 33 and 34 illustrate the case where the present invention is applied to a Schnürle type 2 stroke engine. In FIGS. 33 and 34, reference numeral 66 designates scavenge ports, and 67 an exhaust port. When the scavenge ports 66 are uncovered by the piston 2, fresh air is fed into the combustion chamber 4 from the scavenge ports 66. At this time, burnt gas in the combustion chamber 4 is pushed out into the exhaust port 67. Subsequently, when the scavenge ports 66 and the exhaust port 67 are covered by the piston 2, the compression stroke is started. When the piston 2 approaches TDC, as illustrated by the dashed-dotted line in FIG. 33, a rich air-fuel mixture formed around the projection 10 is ignited by the spark plug 15.

In the engine according to the present invention, various fuels such as methanol, other alcohols, gasoline, liquefied petroleum gas, natural gas, and a mixture thereof can be used. Particularly in the present invention, since substantially all of the fuel injected from the fuel injector 11 is introduced into the cavity 9, the lubricating oil adhering to the wall of the cylinder bore is not diluted by the fuel thus injected. Consequently, no matter which of the above-mentioned fuels is used, it is possible to prevent corrosion of the wall of the cylinder bore.

In addition, since the fuel injector 11 having only the single nozzle bore 12 can be used, the nozzle bore 12 will not be clogged, and in addition, it is not necessary to excessively increase the injection pressure. Consequently, it is possible to improve the reliability and durability of the engine, and lower the manufacturing cost of the engine.

In addition, it has been proven that, where methanol is used, no particulates exist in the exhaust gas, and that the amount of HC, CO and NOx produced is extremely small.

Furthermore, in the present invention, a gaseous fuel may be used. At this time, a large part of gaseous fuel must impinge upon the impingement face 10a so that only air exists in the corner K (FIG. 10) between the flat inner wall of the cylinder head 3 and the peripheral portion of the top face of the piston 2.

According to the present invention, since knocking does not occur, it is possible to considerably increase the compression ratio of the engine, and as a result, since the thermal efficiency is considerably improved, it is possible to considerably improve the fuel consumption.

While the invention has been described by reference to specific embodiments chosen for purposes of illustration, it should be apparent that numerous modifications could be made thereto by those skilled in the art without departing from the basic concept and scope of the invention.

I claim:

1. An internal combustion engine comprising:
    an engine body having at least one cylinder bore formed therein and having an inner end wall which closes one end of said at least one cylinder bore;
    a piston reciprocally movable in said at least one cylinder bore and having a top face which faces said inner end wall, said top face and said inner end wall defining a combustion chamber therebetween, said top face having a cavity formed thereon and having a bottom wall;
    a projection formed on the bottom wall of said cavity within said cavity and having an impingement face which faces said inner end wall;

a fuel injector arranged on said inner end wall and having a nozzle bore directed toward said impingement face to cause a large part of fuel injected from said nozzle bore to impinge upon said impingement face and to create a richer air-fuel mixture layer around said projection at an end of a compression stroke, said injector completing its injection of fuel before said piston reaches a top dead center position; and means for generating a spark to ignite said layer, said spark generating means being arranged on said inner end wall to come in proximity to a sidewall of said projection and in contact with said richer air-fuel mixture layer at the end of the compression stroke.

2. An internal combustion engine according to claim 1, wherein said inner end wall is formed by a flat wall.

3. An internal combustion engine according to claim 1, wherein the top face of said piston is formed by a flat face, and said cavity is formed on a central portion of the top face of said piston.

4. An internal combustion engine according to claim 1, wherein the bottom wall of said cavity is formed by a substantially flat wall.

5. An internal combustion engine according to claim 1, said cavity has a circumferential wall surrounding said projection and extending between the bottom wall of said cavity and the top face of said piston.

6. An internal combustion engine according to claim 5, wherein the circumferential wall of said cavity has a circular contour shape, and said impingement face is arranged at a center of said circular contour.

7. An internal combustion engine according to claim 5, wherein the circumferential wall of said cavity has a circular contour shape, and said impingement face is eccentrically arranged relative to a center of said circular contour.

8. An internal combustion engine according to claim 5, wherein the circumferential wall of said cavity has a polygonal contour shape, and said impingement face is arranged at a center of said polygonal shape.

9. An internal combustion engine according to claim 5, wherein the circumferential wall of said cavity has a substantially cylindrical shape.

10. An internal combustion engine according to claim 9, wherein the circumferential wall of said cavity has an annular rib radially inwardly projecting from an upper end of the circumferential wall of said cavity.

11. An internal combustion engine according to claim 5, wherein the circumferential wall of said cavity has a conical shape.

12. An internal combustion engine according to claim 1, wherein said projection is integrally formed on the bottom wall of said cavity.

13. An internal combustion engine according to claim 12, wherein said projection has a space therein for receiving a coolant.

14. An internal combustion engine according to claim 1, wherein said projection is formed by an impingement member fixed to the bottom wall of said cavity.

15. An internal combustion engine according to claim 14, wherein said impingement member is made of a wear-proof material which is different from a material of said piston.

16. An internal combustion engine according to claim 1, wherein said impingement face is formed by a flat face.

17. An internal combustion engine according to claim 1, wherein said impingement face is formed by a concaved face.

18. An internal combustion engine according to claim 1, wherein said impingement face is formed by a convexed face.

19. An internal combustion engine according to claim 1, said projection has a circumferential wall, and said spark generating means is arranged close to the circumferential wall of said projection at the end of the compression stroke.

20. An internal combustion engine according to claim 19, wherein the circumferential wall of said projection has a frustum shape which diverges toward the bottom wall of said cavity.

21. An internal combustion engine according to claim 19, wherein said impingement face has a portion which is inclined downward toward said spark generating means.

22. An internal combustion engine according to claim 19, wherein the nozzle bore of said fuel injector is directed to a portion of said impingement face, which is positioned near said spark generating means.

23. An internal combustion engine according to claim 19, wherein said fuel injector is arranged at an opposite angle to said spark generating means with respect to an axis of said cylinder bore.

24. An internal combustion engine according to claim 1, wherein said fuel injector is arranged to form a clearance less than 2 mm between said impingement face and the nozzle bore of said fuel injector.

25. An internal combustion engine according to claim 1, further comprising cooling means for cooling said fuel injector.

26. An internal combustion engine according to claim 25, wherein said cooling means comprises a coolant passage surrounding said fuel injector.

27. An internal combustion engine according to claim 26, wherein said cooling means comprises a metallic hollow tube extending through said coolant passage, said fuel injector being fitted into said hollow tube.

28. An internal combustion engine according to claim 26, wherein said cooling means comprises a cooler for cooling a coolant, and a pump for feeding the coolant into said coolant passage via said cooler.

29. An internal combustion engine according to claim 1, wherein said fuel injector has a single nozzle bore.

30. An internal combustion engine according to claim 1, wherein a large part of fuel injected from said nozzle bore impinges upon said impingement face in the form of liquid fuel.

31. An internal combustion engine according to claim 1, wherein substantially all of the fuel injected from said fuel injector is directed toward said cavity.

32. An internal combustion engine according to claim 1, wherein the fuel injecting operation of said fuel injector is started at about 60 degrees B.T.D.C when the engine is operating under a heavy load.

33. An internal combustion engine according to claim 32, wherein the fuel injecting operation of said fuel injector is started at about 100 degrees B.T.D.C when the engine is operating under a heavy load at a high speed.

34. An internal combustion engine according to claim 1, wherein a normally fully open air control valve is arranged in an intake passage and said control valve is half open when the engine is operating under a light load.

35. An internal combustion engine according to claim 1, wherein the compression rate is higher than 12:1.

* * * * *

UNITED STATES PATENT AND TRADEMARK OFFICE
CERTIFICATE OF CORRECTION

PATENT NO. : 4,770,138

DATED : September 13, 1988

INVENTOR(S) : Sigeru Onishi, Kanazawa, Japan

It is certified that error appears in the above-identified patent and that said Letters Patent is hereby corrected as shown below:

On the Title Page, Item [73], change
"Nippon Clen Engine  Research Institute Co. Ltd., Ishikawa, Japan" to
--Nippon Clean  Engine Research Institute Co. Ltd., Ishikawa, Japan--

Page 1, in the caption, Item [21], change "Appl. No. 970,414" to --Appl. No. 041, 436--.

Page 1, in the caption, Item [30], change
"Dec. 24, 1986 [JP] Japan.......61-31670" to
--Dec. 24, 1986 [JP] Japan.......61-313670--.

Signed and Sealed this

Eighteenth Day of April, 1989

Attest:

DONALD J. QUIGG

*Attesting Officer*        Commissioner of Patents and Trademarks